Figure 1:
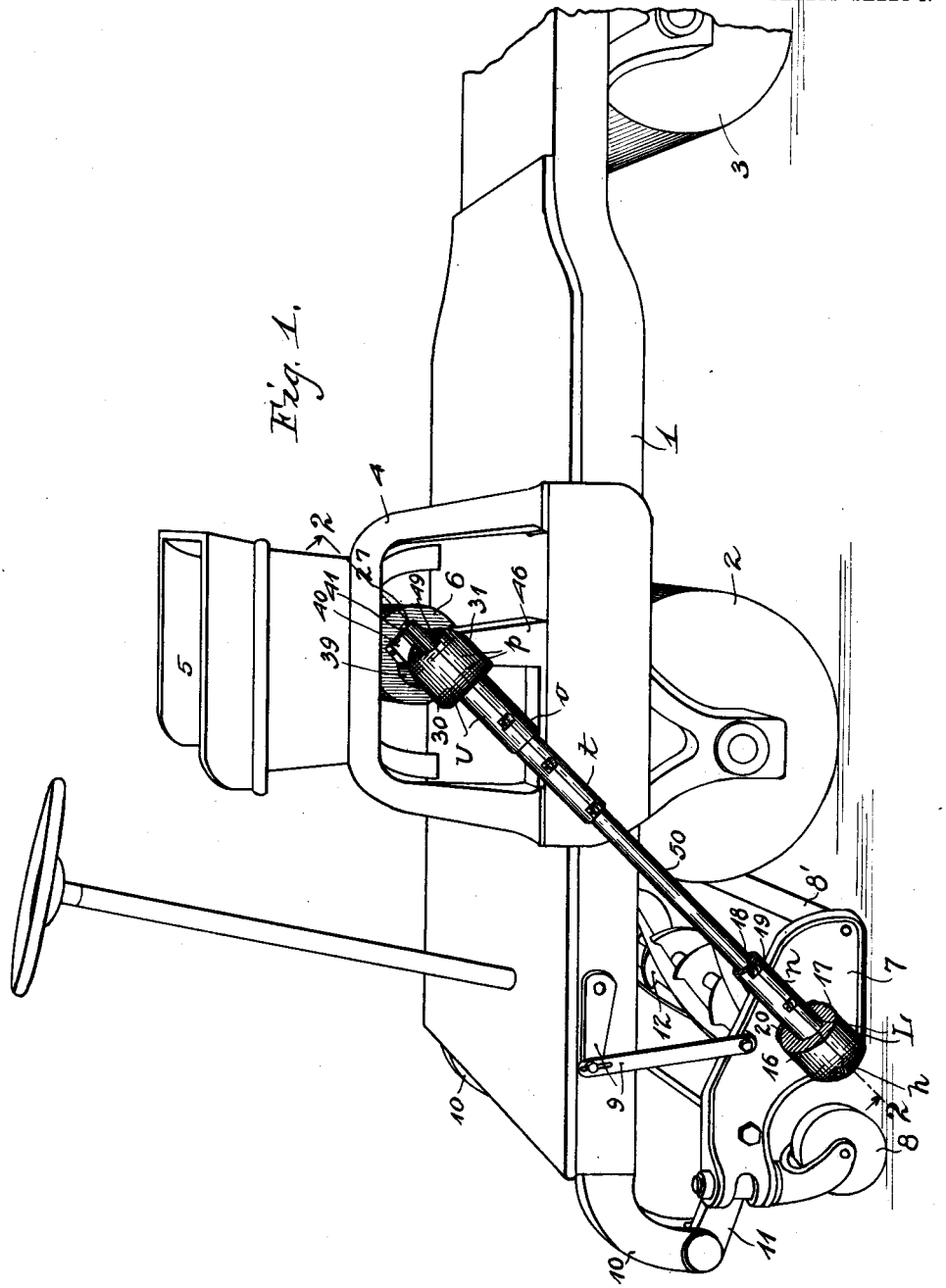

H. S. MUSTIN.
TRANSMISSION MECHANISM.
APPLICATION FILED DEC. 9, 1909.

1,051,619.

Patented Jan. 28, 1913.

Witnesses:
Charles J. Schmidt.
S. N. Pond

Inventor
Herbert S. Mustin
By Offield, Towle, Graves & Offield
Attys.

UNITED STATES PATENT OFFICE.

HERBERT S. MUSTIN, OF CHICAGO, ILLINOIS, ASSIGNOR TO THE AUSTIN MANUFACTURING COMPANY, OF CHICAGO, ILLINOIS, A CORPORATION OF ILLINOIS.

TRANSMISSION MECHANISM.

1,051,619.  Specification of Letters Patent.  Patented Jan. 28, 1913.

Application filed December 9, 1909. Serial No. 532,202.

*To all whom it may concern:*

Be it known that I, HERBERT S. MUSTIN, a resident of Chicago, in the county of Cook and State of Illinois, have invented certain new and useful Improvements in Transmission Mechanism, of which the following is a full, clear, and precise specification.

My invention relates to transmission mechanism particularly adaptable in power driven lawn-mowers for yieldingly connecting the driving source with the cutting parts.

In lawn mowers, to which my invention is particularly adaptable, the driving mechanism is mounted on the machine body and the lower part pivotally connected with the body to be pulled thereby. The mower part as a whole is free to move relatively to the body part to follow the profile of the ground independently of the body part and is also positively adjustable by the operator to be raised or lowered to clear obstructions. The transmission mechanism for connecting the driving mechanism with the rotating blade frame of the mower part must, therefore, be adapted to follow the various relative movements between the driving mechanism and the mower part but must maintain efficient driving connection at all times.

The salient objects of my invention are, therefore, to provide transmission mechanism which will always retain proper and efficient connection with the driving source and the rotating mower part and which will operate universally to cause efficient drive under all conditions of relative movement between the engine and mower frame; to provide such constructions for the transmission mechanism that the operator will be protected from the coöperating transmission parts; to provide such construction for the transmission mechanism which will enable it to be readily dissociated from the machine or applied hereto; and in general to provide features of construction and arrangement which will adapt the transmission mechanism particularly for machines of the class referred to.

In the following specification and accompanying drawings my invention is clearly described and illustrated.

Figure 2:
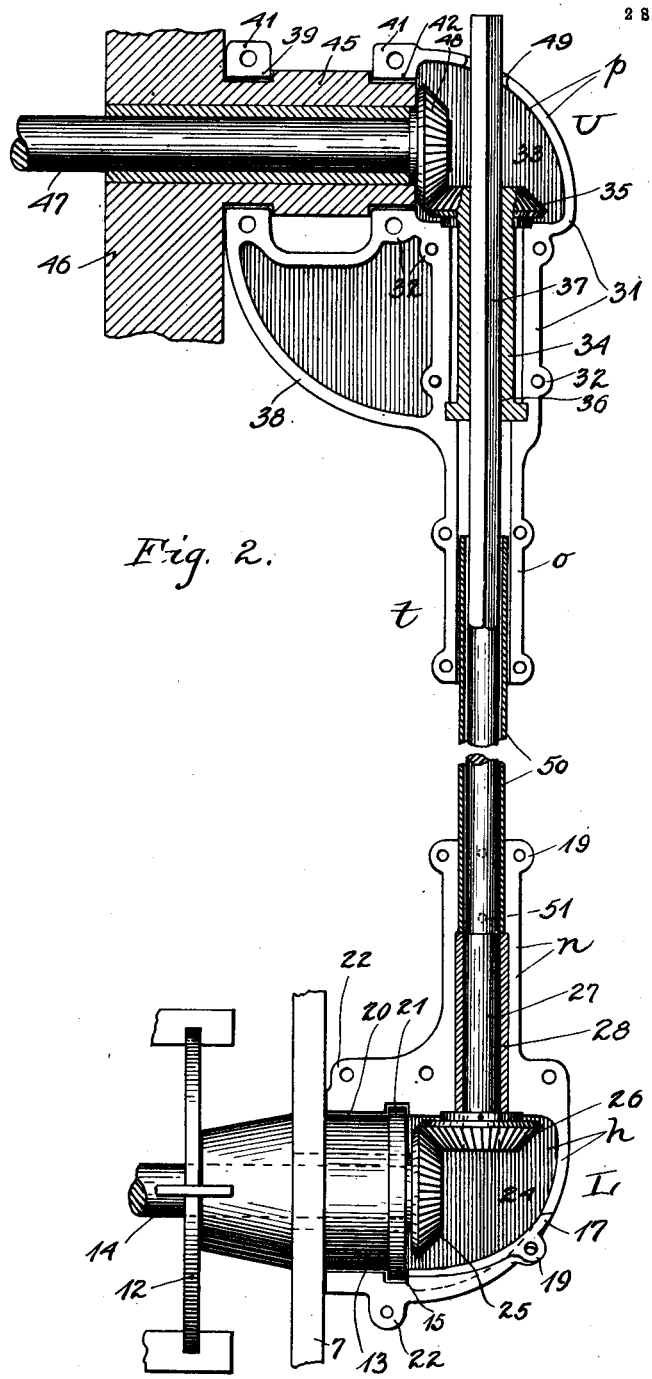

In the drawings Figure 1 is a perspective side elevation of a machine showing the application of my improved transmission mechanism, and Fig. 2 is an enlarged view of the transmission mechanism looking from plane 2—2, Fig. 1, the top halves of the housings being removed.

Referring to Fig. 1, the lawn mower body 1 is mounted on a front roller 2 and a rear steering roller 3. Frame work 4 supports a seat 5 beneath which is arranged the driving mechanism 6 which may include an explosive engine and its accessories. The mower part comprises side frame work 7 whose front ends are supported on casters 8 and whose rear ends are supported on guard roller 8'. The arms 10 extending forwardly from the front of the body 1 connect through links 11 with the frame work 7 so that as the machine is driven in forward direction the mower part is bodily pulled over the ground and the pivotal link connection will allow the mower part to move bodily relatively to the body to follow the profile of the ground. Link mechanism 9 connects with the mower part and is controllable by the operator to positively control the adjustment of the mower part with reference to the ground, but this link connection provides sufficient lost motion so that the mower part is free to follow the profile of the ground during operation of the machine. The mowing mechanism has the rotary blade frame 12 which is to be driven from the driving mechanism 6, and as a means for effecting such driving connection I have shown my improved transmission mechanism represented as a whole by *t*. The construction of this mechanism is more plainly shown in Fig. 2. An upper housing and bearing frame designated as a whole by U is carried by the machine body, and a lower housing and bearing frame L is carried by the mowing mechanism. The frame 7 shown in Fig. 1 has a hub 13 in which is journaled shaft 14 supporting the blade frame 12, this hub having at its outer end the flange 15. The lower frame L comprises upper and lower halves 16 and 17 each cast integral and of substantially semi-annular cross-section, so that when fitted together they form a head part *h* and a neck part *n* extending from the head part at an angle. At suitable points registering lugs 18 and 19 are provided on the halves 16 and 17 for receiving bolts for locking the halves together in proper alinement to form the housing. The end of the head part has the outer section 20 encircling the hub 13 and an inner narrower section 21 of greater diameter encircling the flange 15. Lugs 22 extend from the halves 16 and 17 adjacent the sections 20 and 21 to receive bolts for clamping the ends of the head halves together about the hub, the housing L being then confined to the hub by the flange 15. The connection is, however, sufficiently loose radially and longitudinally so that the housing L may play about the hub. The section of the head between the clamping end and the neck $n$ forms a gear compartment 24 for accommodating a bevel gear 25 secured to the end of trunnion 14 and a bevel pinion 26 secured to the end of shaft 27 connected with the driving mechanism, as will be explained later. As shown, the axis of the cylindrical neck $n$ is at right angles with that of the head outlet, and the neck is lined by a brass bushing 28 in which the lower end of shaft 27 journals. The compartment 24 will also serve as an oil reservoir for supplying oil to the various operating parts.

The upper frame or housing comprises upper and lower casting halves 30 and 31 held together by bolts passing through registering lugs 32. The neck part $o$ of this housing terminates at its upper end in the head part $p$ which forms the gear compartment 33. In the upper end of the neck part $o$ is journaled a sleeve 34 carrying at its upper end the bevel gear 35 operating in compartment 33. The sleeve and gear have a polygonal bore 36 for receiving the upper polygonal end 37 of the shaft 27 which at its lower end carries the pinion 26 already referred to, the polygonal end of the shaft being freely slidable through the bore 36. A bracket section 38 extends from the upper end of the neck part $o$ and at its outer end the halves thereof expand to form a ring 39 having lugs 40 and 41 for clamping the halves together. At the inner end of the bracket and adjacent the head part the halves expand to form a ring 42 of the same diameter as ring 39 and registering axially therewith, ring 42 also having lugs for receiving clamping screws. The rings 39 and 42 are applied about a hub 45 extending from a bracket 46 supported on the machine body 1, the clamping engagement being such that the housing U will be retained securely on the hub but will be free for pivotal and slight longitudinal movement thereon. The outer end of shaft 47 is supported in the hub 45 and at its end secures a bevel pinion 48 meshing with bevel gear 35, the inner end of the shaft 47 being connected with the driving mechanism 6. In the top of the head part $p$ is an opening 49 through which the upper end of shaft 27 may pass, this being of tempered steel and therefore quite flexible.

With the construction and arrangement described the various gear members are entirely inclosed and the operator is thus protected against contact with the gear members. In order to protect the operator against contact with the revolving shaft between the upper and lower housings this section of the shaft is inclosed in a pipe 50 which extends into the lower housing L and is secured thereto by set screws 51 and whose upper end telescopes into the lower end of neck part $o$. Thus all the moving parts of the transmission mechanism are entirely inclosed. The freedom of movement of the housings with respect to their supporting members and the longitudinal relative movement and the flexibility of the transmission shaft enable the transmission mechanism to readily follow and adapt itself to the various relative displacements and movements between the mower part and the machine body while at the same time perfect driving connection is maintained between the various gears, and therefore, between the driving mechanism and the rotating cutting frame. The transmission is, therefore, always efficient independently of relative movement between the driving parts and the mower frame, and the operator is at all times protected by the housing, being also protected from the moving gears and shafts by the housing. The transmission mechanism can be readily detached from the machine and can be as readily applied.

I do not wish to be limited to the precise construction and arrangement which I have shown, as changes may readily be made which will still come within the scope of my invention, and I desire to secure the following claim by Letters Patent:

In combination, a hub, a driving shaft journaled in said hub, said hub having a central annular ridge, a bearing housing having collars engaging said hub at either side of said ridge and having limited radial and longitudinal lost motion on said hub, a second hub, a drive shaft journaled in said second hub, a bearing housing having pivotal engagement with said second hub and having radial and longitudinal lost motion with reference to said second hub, a transmission shaft extending into both housing frames, a bevel gear at the lower end of said shaft within the second mentioned housing, a bevel pinion at the end of the drive shaft meshing with said transmission shaft gear wheel, a driving bevel pinion at the end of the driving shaft and within the first mentioned housing, a bevel pinion having a hub journaled in said first mentioned housing, said hub having a polygonal bore for receiving the polygonal upper end of said transmission shaft whereby said first mentioned housing may move bodily with reference to the second mentioned housing and with reference to said transmission shaft, the lost motion connection of said housing frames with said hubs allowing said hubs to move bodily freely with reference to each other.

In witness whereof, I hereunto subscribe my name this 4th day of December, A. D., 1909.

HERBERT S. MUSTIN.

Witnesses:
CHARLES J. SCHMIDT,
NELLIE B. DEARBORN.